United States Patent
Harsola et al.

(10) Patent No.: US 11,646,014 B1
(45) Date of Patent: May 9, 2023

(54) ENSEMBLE OF MACHINE LEARNING MODELS FOR REAL-TIME PREDICTIONS IN EXPERT ELECTRONIC CHATS

(71) Applicant: INTUIT INC., Mountain View, CA (US)

(72) Inventors: Shrutendra Harsola, Bangalore (IN); Sourav Prosad, Bangalore (IN); Viswa Datha Polavarapu, Bangalore (IN)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 17/814,759

(22) Filed: Jul. 25, 2022

(51) Int. Cl.
| | | |
|---|---|---|
| *G10L 15/16* | (2006.01) | |
| *G10L 15/197* | (2013.01) | |
| *G06N 3/045* | (2023.01) | |
| *G06N 3/047* | (2023.01) | |

(52) U.S. Cl.
CPC ............. *G10L 15/16* (2013.01); *G06N 3/045* (2023.01); *G06N 3/047* (2023.01); *G10L 15/197* (2013.01)

(58) Field of Classification Search
CPC ............................ G10L 15/16; G10L 15/197
See application file for complete search history.

(56) References Cited

U.S. PATENT DOCUMENTS

| | | | | |
|---|---|---|---|---|
| 10,074,102 | B2* | 9/2018 | N ........................ | G06F 16/3322 |
| 10,078,673 | B2* | 9/2018 | Nagel ................ | G06F 3/04886 |
| 11,157,695 | B1* | 10/2021 | Shi ...................... | H04M 3/5175 |
| 11,314,945 | B1* | 4/2022 | Nguyen ................. | G06F 40/42 |
| 2010/0145694 | A1* | 6/2010 | Ju ........................... | G10L 15/22 |
| | | | | 704/235 |
| 2019/0205372 | A1* | 7/2019 | Li ......................... | G06N 20/00 |
| 2021/0103700 | A1* | 4/2021 | Toplyn ................ | G06N 3/0445 |
| 2021/0256417 | A1* | 8/2021 | Kneller ................. | G06N 3/088 |
| 2021/0279577 | A1* | 9/2021 | West .................... | G06N 3/0445 |
| 2022/0222481 | A1* | 7/2022 | Mohanty ............. | G06N 3/0445 |
| 2022/0293092 | A1* | 9/2022 | Ding ...................... | G10L 15/18 |

* cited by examiner

Primary Examiner — Kevin Ky
(74) Attorney, Agent, or Firm — DLA Piper LLP (US)

(57) ABSTRACT

An ensemble of machine learning models used for real-time prediction of text for an electronic chat with an expert user. A global machine learning model, e.g., a transformer model, trained with domain specific knowledge makes a domain specific generalized prediction. Another machine learning model, e.g., an n-gram model, learns the specific style of the expert user as the expert user types to generate more natural, more expert user specific text. If specific words cannot be predicted with a desired probability level, another word level machine learning model, e.g., a word completion model, completes the words as the characters are being typed. The ensemble therefore produces real-time, natural, and accurate text that is provided to the expert user. Continuous feedback of the acceptance/rejection of predictions by the expert is used to fine tune one or more machine learning models of the ensemble in real time.

19 Claims, 14 Drawing Sheets

ENSEMBLE OF MACHINE LEARNING MODELS FOR REAL-TIME PREDICTIONS IN EXPERT ELECTRONIC CHATS

BACKGROUND

Machine learning based natural language processing techniques are widely used. Their uses range from, for example, voice commands on smart assistants to an analysis of large a corpus of text for electronic records of user questions and answers. For voice commands, a backend system typically looks for trigger words (e.g., "play," "stop," etc.) and other associated words (e.g., "track") to determine and perform the voiced command (e.g., "stop the playing track."). For the analysis of the large corpus of text, one or more trained machine learning models analyze text structure and organization to determine a meaning (e.g., a summary) of the text.

Natural language processing is used for analyzing real-time text such as e.g., text used in electronic chats. But conventional machine learning models are inadequate for processing real-time text, particularly text involving domain specific terms. For example, domain experts may use electronic chats to communicate with expert advice seekers (such as customers). As the expert types in a chat window, predicting the next sequence of letters and words would be tremendously beneficial for the experts—but the conventional techniques and machine learning models fall short for these types of predictions. For instance, conventional machine learning models are generalized and static: trained on a large corpus of general text to make generalized predictions without dynamic, real-time fine tuning. The models trained for generalized predictions cannot handle domain specific text. The static models also cannot handle style (and idiosyncrasies) of a human expert and typically generate stilted, unnatural text. If conventional models are used, these shortcomings compound to make predictions that are neither accurate nor natural.

In addition to the above technical shortcomings, updates to the existing machine learning models are problematic too. As the initial training of these models are on a large set of training data, any update will necessarily have to use large training sets. The updates therefore take significant computing resources and lead time, generally in the order of days. Furthermore, an updated model remains static until the next update. There is no mechanism for the models to fine tune the predictions based on real-time dynamic behavior in the electronic chats.

As such, a significant improvement in processing real-time electronic chat texts to generate more accurate and natural predictions is therefore desired.

SUMMARY

Embodiments disclosed herein solve the aforementioned technical problems and may provide other technical solutions as well. An ensemble of machine learning models is used for real-time prediction of an expert user's text in e.g., an electronic chat. A global machine learning model, e.g., a transformer model, trained with domain specific knowledge makes a domain specific generalized prediction. Another machine learning model, e.g., an n-gram model, learns the specific style of the expert user as the expert user types to generate more natural, more expert user specific text. If specific words and or phrases cannot be predicted with a desired probability level, another word level machine learning model, e.g., a word completion model, completes the words as the characters are being typed. The ensemble therefore produces real-time, natural, and accurate text that is provided to the expert user. Continuous feedback of the expert user's acceptance/rejection of the predicted text is used to fine tune one or more machine learning models of the ensemble in real time.

DETAILED DESCRIPTION OF SEVERAL EMBODIMENTS

Embodiments disclosed herein provide real-time, dynamic predictions based on an ensemble of a global model for domain specific knowledge, a local model for the expert user specific style, and a word specific knowledge model for word completion. In one or more embodiments, the global model is a generalized transformer model such as a GPT2 model trained and retrained using domain specific data. In one or more embodiments, the local model is an n-gram machine learning model trained during runtime to capture expert user specific style and make predictions based thereon. The combined global and local model or sentence completion model is typically invoked when the expert users press <space> after completing a word. In one or more embodiments, the word specific knowledge model is a word completion machine learning model that completes words as the characters are being typed. The word completion model is typically invoked when the global model and or the local model do not make predictions with desired probability levels. In addition, one or more models in the ensemble are continuously fine tuned based on the success of the predictions (e.g., whether the expert user accepts or rejects the predictions).

Figure 1:
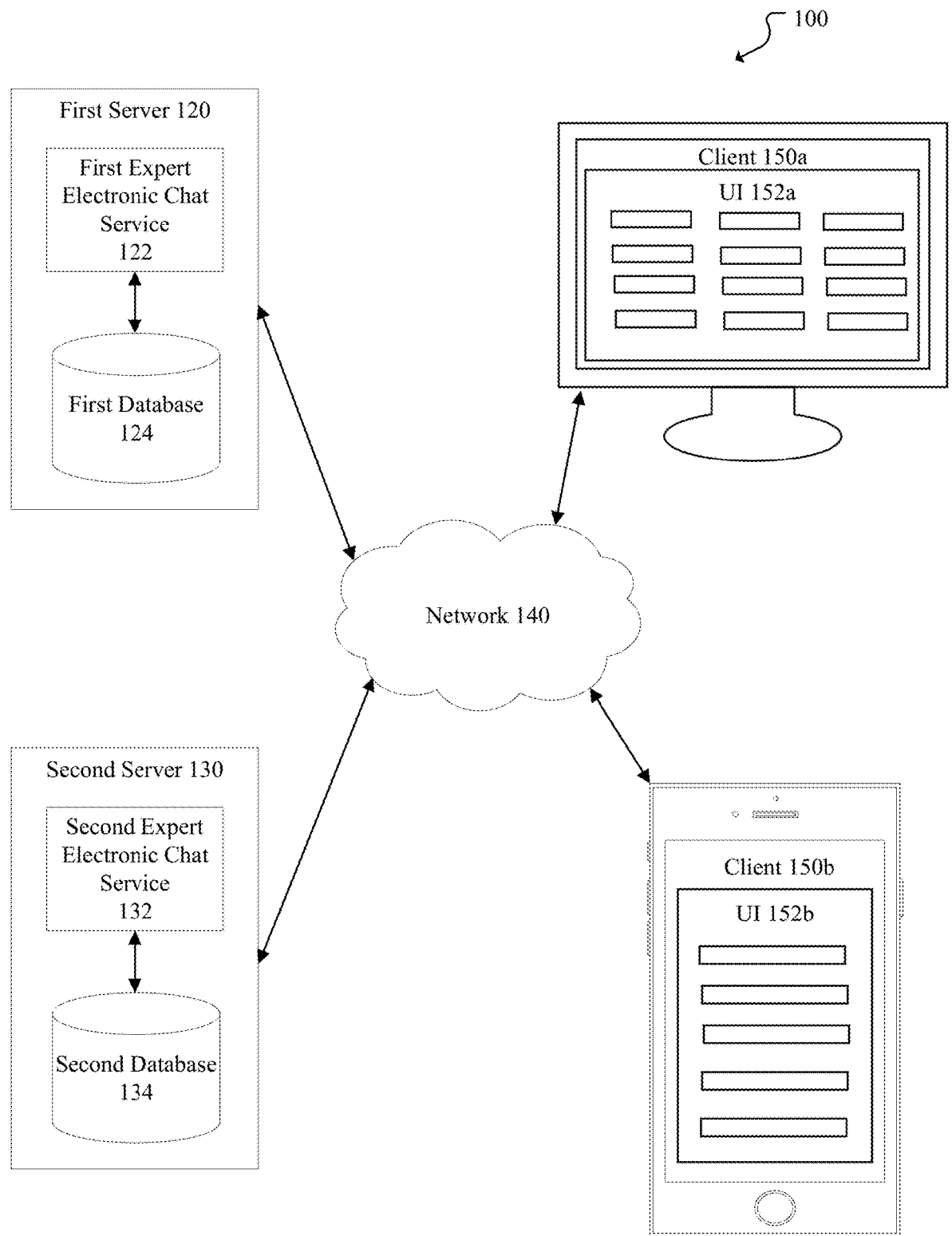
FIG. 1 shows an example of a system configured for real-time text prediction for expert electronic chats, based on the principles disclosed herein.

FIG. 1 shows an example of a system 100 configured for real-time text prediction for expert electronic chats, based on the principles disclosed herein. It should be understood that the components of the system 100 shown in FIG. 1 and described herein are merely examples and systems with additional, alternative, or fewer number of components should be considered within the scope of this disclosure.

As shown, the system 100 comprises client devices 150a, 150b (collectively, "client devices 150") and servers 120, 130 interconnected through a network 140. A first server 120 hosts a first expert electronic chat service 122 and a first database 124 and a second server 130 hosts a second expert electronic chat service 132 and a second database 134. The client devices 150a, 150b have user interfaces 152a, 152b, which are used to communicate with the expert electronic chat services 122, 132 using the network 140. For example, communication between the elements is facilitated by one or more application programming interfaces (APIs). APIs of system 100 may be proprietary and or may include such APIs as Amazon® Web Services (AWS) APIs or the like. The network 140 may be the Internet and or other public or private networks or combinations thereof. The network 140 therefore should be understood to include any type of circuit switching network, packet switching network, or a combination thereof. Non-limiting examples of the network 140 include a local area network (LAN), metropolitan area network (MAN), wide area network (WAN), and the like.

Client devices 150 include any device configured to present user interfaces (UIs) 152 and receive user inputs such as questions posed on expert chat rooms. The UIs 152 are configured to display responses (e.g., expert electronic chat) to the user inputs 154. The responses include, for example, expert answers, expert chat queue confirmation, contact information of the expert, and or other outputs generated by the first server 120. The UIs 152 also capture session data including UI screen identifiers (id), product id (e.g., identifying the product that the expert electronic chat is for), input text/product language, geography, platform type (e.g., online vs. mobile), and or other context features. Exemplary client devices 150 include a smartphone, personal computer, tablet, laptop computer, and or other similar devices.

In some embodiments, the first expert electronic chat service 122 and or second expert electronic chat service 132 is associated with an information service, which is any network 140 accessible service that maintains financial data, medical data, personal identification data, and or other data types. For example, the information service may include TurboTax®, QuickBooks®, Mint®, Credit Karma®, MailChimp® and or their variants by Intuit® of Mountain View, Calif. The information service provides one or more features that may need expert support, automation of which is facilitated by the expert electronic chat services 122, 132 within the system 100. It should however be understood that the two expert electronic chat services 122, 132 are just for illustration; and the system 100 may include a large number of expert electronic chat services.

One or more embodiments disclosed herein facilitate text predictions for the expert electronic chat services 122, 132 using an ensemble of trained machine learning models. The ensemble of the trained machine learning models may comprise, for example, Generative Pre-Trained Transformer 2 (GPT2), an n-gram, and a character based recurrent neural network (RNN). The GPT2 model provides a global prediction of expert text and the n-gram model provides local prediction of expert text based on the style of the expert. Generally, in the cases where the text cannot be predicted, the RNN completes the word (referred to herein as "word completion") when the first few letters are typed. It should however be understood that these models and the corresponding specific operations are just for illustration only—and any type of model implementing the embodiments should be considered within the scope of this disclosure.

First server 120, second server 130, first database 124, second database 134, and client devices 150 are each depicted as single devices for ease of illustration, but those of ordinary skill in the art will appreciate that first server 120, second server 130, first database 124, second database 134, and or client devices 150 may be embodied in different forms for different implementations. For example, any or each of first server 120 and second server 130 may include a plurality of servers or one or more of the first database 124 and second database 134. Alternatively, the operations performed by any or each of first server 120 and second server 130 may be performed on fewer (e.g., one or two) servers. In another example, a plurality of client devices 150 may communicate with first server 120 and/or second server 130. A single user may have multiple client devices 150, and/or there may be multiple users each having their own client devices 150.

Figure 2:
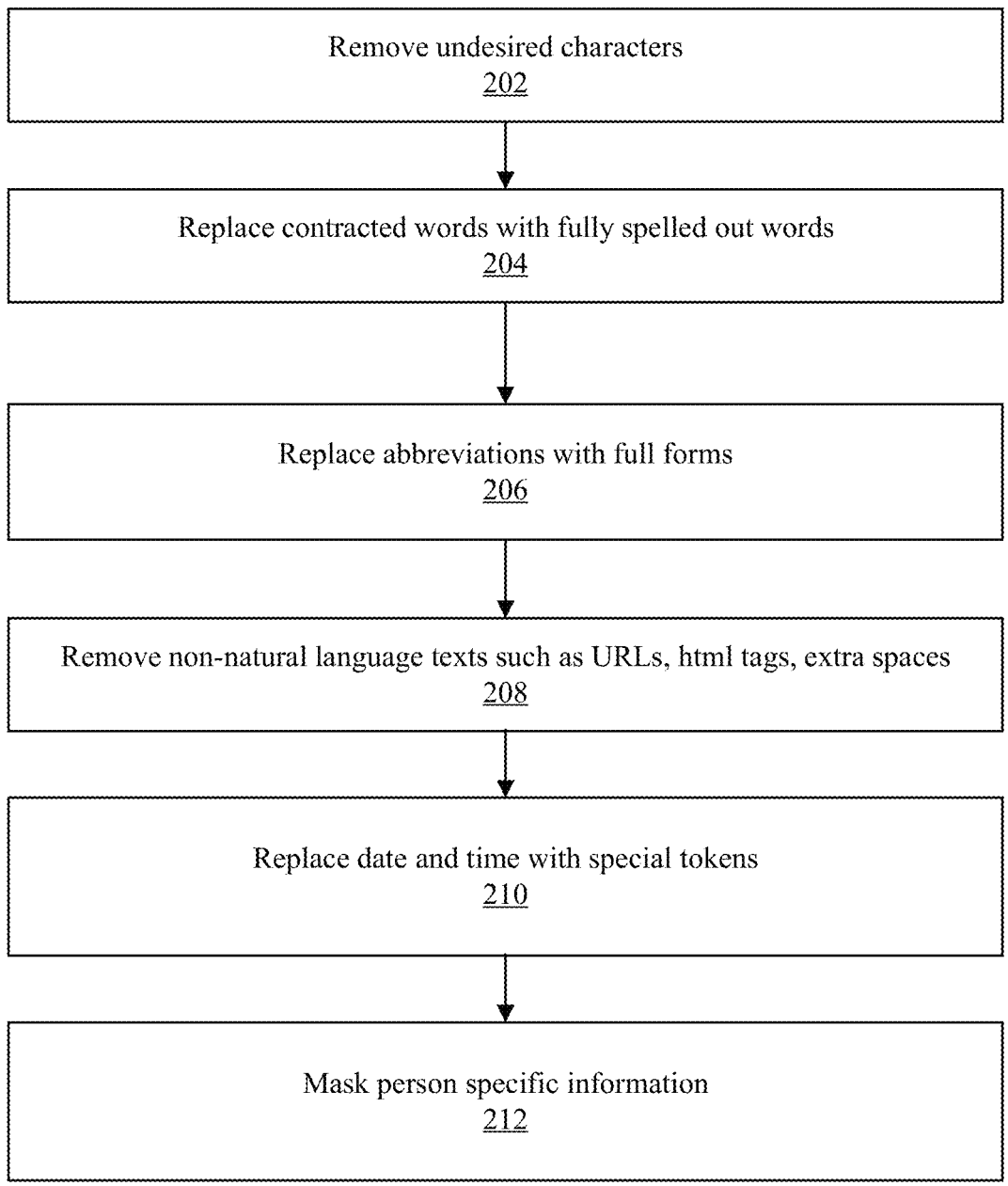
FIG. 2 shows a flow diagram of an example method of pre-processing data for one or more machine learning models in an ensemble of machine learning models, based on the principles disclosed herein.

FIG. 2 shows a flow diagram of an example method 200 of pre-processing data for one or more machine learning models in an ensemble of machine learning models, based on the principles disclosed herein. The data used for the ensemble of machine learning models includes text from the expert electronic chats and or contextual data associated therewith. It should be understood that method 200 shown in FIG. 2 and described herein is just an example, and methods with additional, alternative, and fewer number of steps should be considered within the scope of this disclosure. The steps of the method 200 may be performed by one or more components of the system 100 shown in FIG. 1.

The method 200 begins at step 202 where undesired characters are removed from input text. The undesired characters may include, for example, codes within the text, where the codes indicate the electronic organization of the text. For instance, the undesired characters may include codes such as "\n," "\t," etc. At step 204, contracted words are replaced with fully spelled out words. For example, "can't" is replaced with "cannot"; "don't" is replaced with "do not"; "isn't" is replaced with "is not"; and the like. It is generally more efficient for the ensemble of machine learning models to have the fully spelled out words compared to having an extra layer of conversion/coding to correlate contracted words to the fully spelled out words.

At step 206, abbreviations are replaced with their respective full form representations. For example, "mfs" is replaced with "monthly financial statements"; "sku" is replaced with "stock keeping unit"; "tps reports" is replaced "test procedure specification reports," and the like. At step 208, other non-natural language texts such as universal resource locators (URLs), html tags, extra spaces, etc. are removed. The non-natural language texts may not necessarily be relevant for understanding the meaning of the natural text and therefore may be just noise for the ensemble of the machine learning models disclosed herein. At step 210, any date and time are replaced with tokens. For instance, a date of Oct. 12, 2021 is replaced by a <date> token and 5:30 PM is replaced with a <time> token. The tokens generally are standard tokens compatible with the ensemble of the machine learning models disclosed herein. At step 212, person specific information is masked. In other words, any personal data is anonymized.

These pre-processing steps (and or similar steps) facilitate a more efficient training of the ensemble of the machine learning models disclosed herein by removing unnecessary items (e.g., code, non-natural text, etc.). The pre-processing steps are also used in the deployment stage, i.e., input text data is pre-processed before being fed into the disclosed ensemble of the trained machine learning models.

Figure 3:
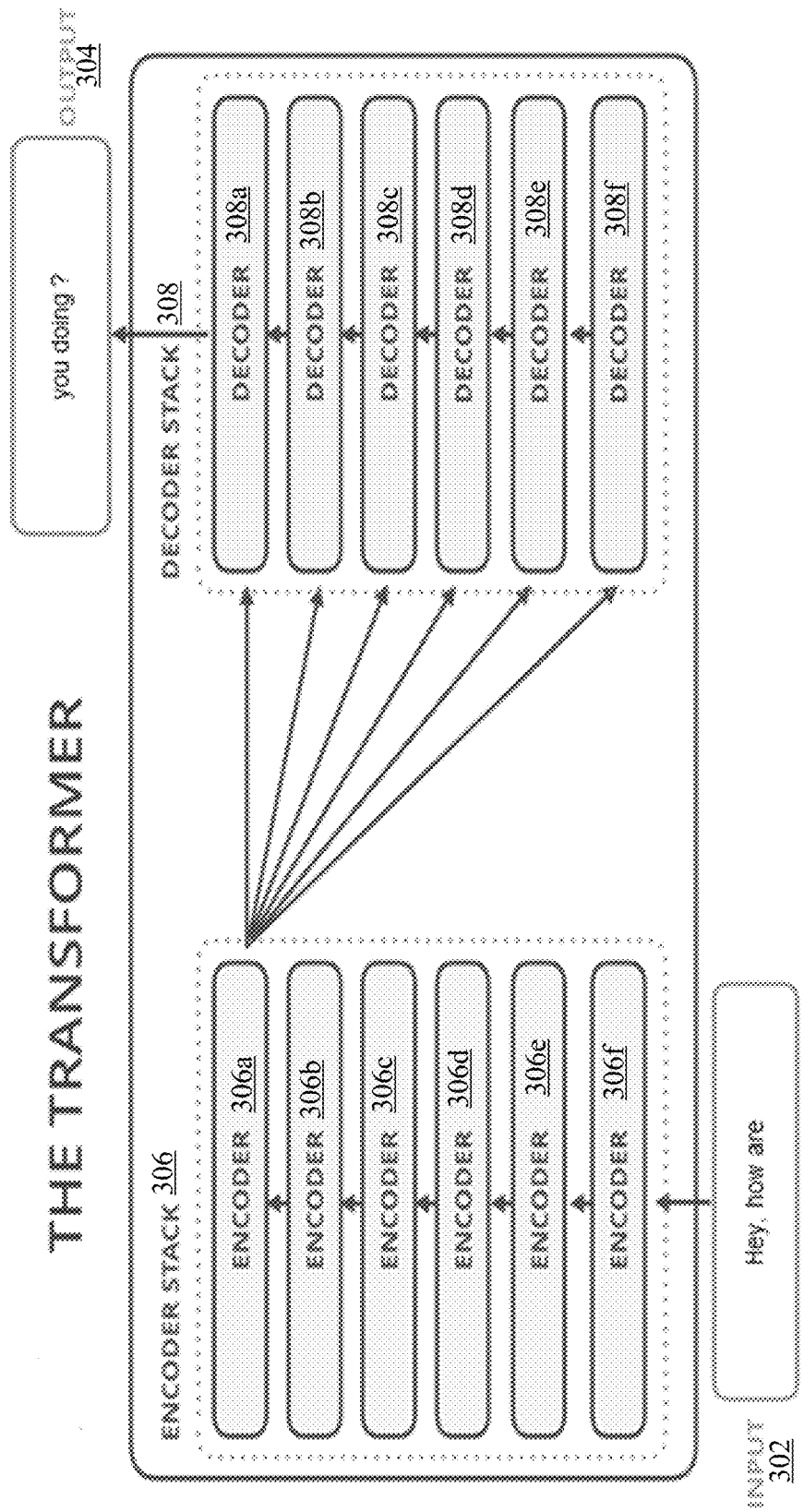
FIG. 3 shows an example transformer model within the ensemble of the machine learning models, based on the principles disclosed herein.

FIG. 3 shows an example transformer model 300 to be used within the ensemble of machine learning models disclosed herein. The transformer model 300 is a part of the GPT2 model discussed above. It should, however, be understood that the transformer model 300 and the structure shown in FIG. 3 is just an example, and other models with similar functionality should be considered within the scope of this disclosure.

The transformer model 300 (and a GPT2 model generally) is used for predicting the next token (e.g., next word) in text. It should however be understood that the GPT2 model can predict a next set of tokens (e.g., next set of words) as well. The outputs (or labels of the outputs) are the same as the inputs but shifted to the right. For example, Table 1 shows the inputs and outputs of a portion of the sample text below:

"i just uploaded detailed payroll reports for the first quarter of and for the first quarter of and 401k report for first quarter 2020. i will send you a quarter every day this week. At the end of this week, I would like to have a meeting to discuss the best and easiest way to proceed for 2021. i will go ahead and schedule that meeting at this time. Thanks"

TABLE 1

Inputs and Outputs for a Transformer Model

| Input | Output |
|---|---|
| i just uploaded detailed payroll for the first quarter of and 401k report first quarter 2020. i will send you quarter every day this week. At the | just uploaded detailed payroll reports the first quarter of and 401k report for quarter 2020. i will send you a every day this week. At the end |

As shown above, the text in a dataset (i.e., data pre-processed using method 200) is tokenized and separated into chunks of different sequence lengths. When an input chunk is chosen, the output chunk is a one token (i.e., one word) right shifted from the input chunk.

As shown FIG. 3, the transformer model 300 is trained to generate, in response to input 302 text (e.g., "Hey how are"), output 304 text that provides the next sequence of words ("you doing?"). Structurally, the transformer model comprises an encoder stack 306 with encoder layers 306a-306f and a decoder stack 308 with decoder layers 308a-308f. However, the specific numbers of encoder layers 306a-306f and decoder layers 308a-308f are just examples and therefore non-limiting—stacks with any number of encoder layers or decoder layers should be considered within the scope of this disclosure.

Figure 4:
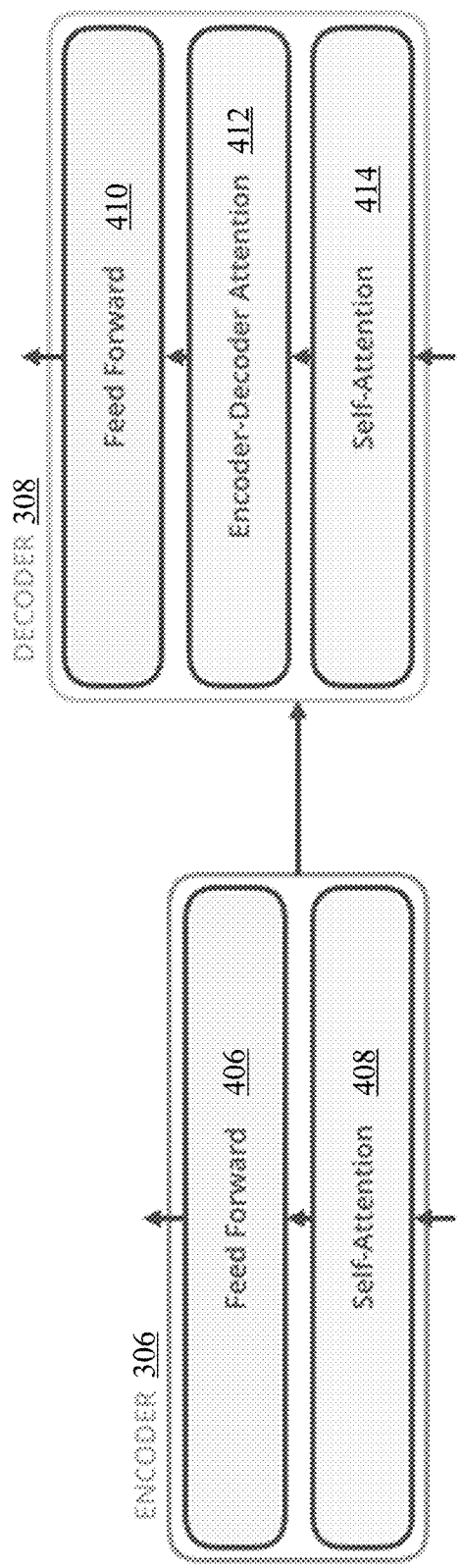
FIG. 4 shows components of an encoder layer and a decoder layer in the example transformer model shown in FIG. 3, based on the principles disclosed herein, based on the principles disclosed herein.

FIG. 4 shows components of an encoder layer and a decoder layer in the example transformer model shown in FIG. 3, based on the principles disclosed herein. As shown, there is a feed forward layer 406 and a self-attention layer 408 within an encoder layer in the encoder stack 306. As also shown, there is a feed forward layer 410, an encoder-decoder attention layer 412, and a self-attention layer 414 within a decoder layer in the decoder stack 308.

An input to the encoder layer therefore flows through the self-attention layer 408. The self-attention layer 408 enables the encoder layer to look at other words in an input sentence as the encoder layer encodes a specific word of the sentence. The outputs of the self-attention layer 408 are fed to the feed forward layer 406 of the encoder layer. In some embodiments, the same or similar feed forward layer 406 is applied to each of the encoder layers.

The decoder layer's self-attention layer 414 may be similar to self-attention layer 408 of the encoder layer and the decoder layer's feed forward layer 410 may be similar to the feed forward layer 406 of the encoder layer. The self-attention layer 414 enables the decoder layer to look at other words in the input sentence as it decodes a word in the input sentence. In some embodiments, the same or similar feed forward layer 410 are applied to each encoder layer. The decoder layer also has an encoder-decoder attention layer 412 in between the self-attention layer 414 and the feed forward layer 410. The encoder-decoder attention layer 412 also enables the decoder layer to focus on relevant parts of a sentence input into the decoder layer.

Figure 5A:
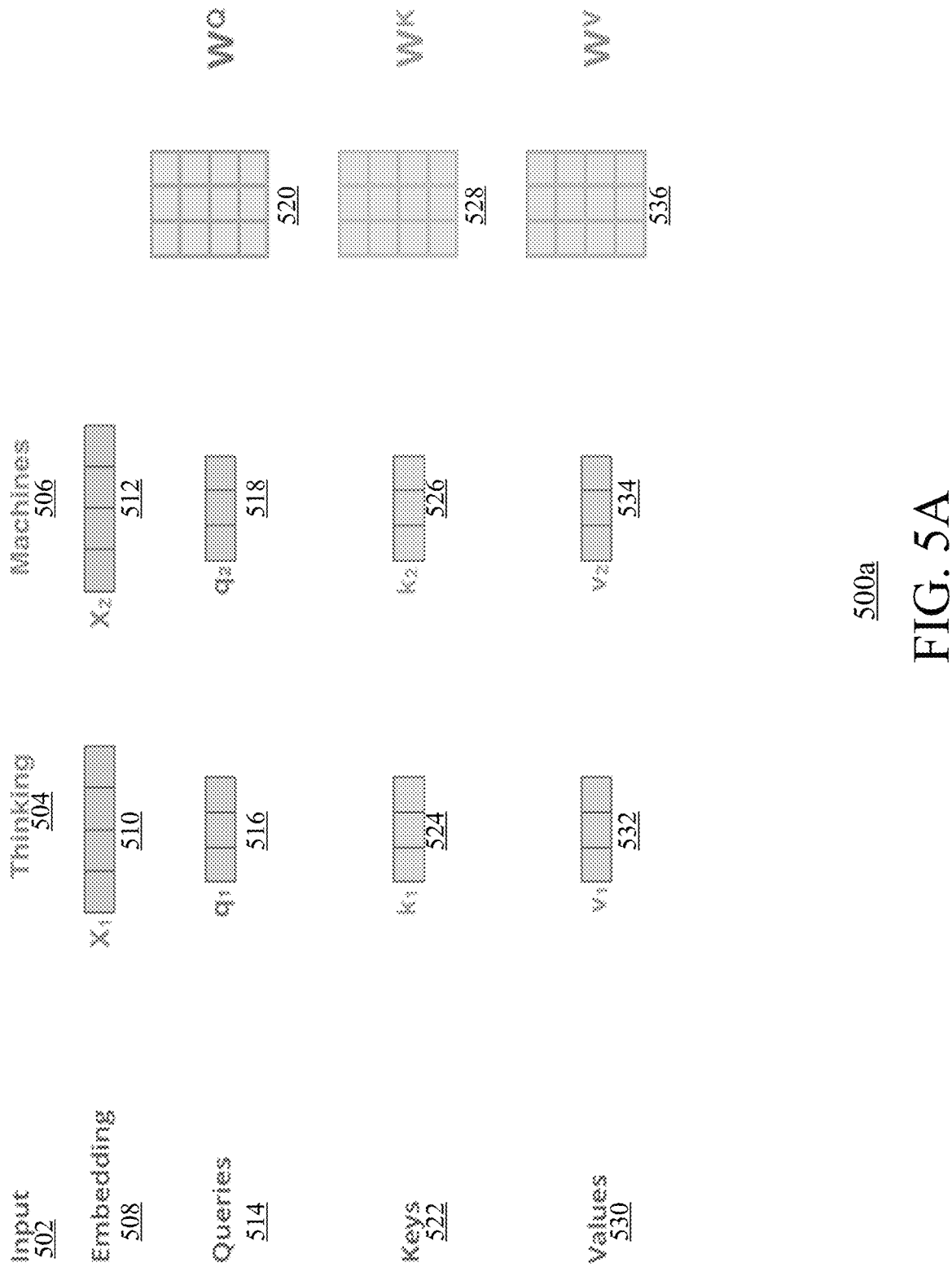
FIG. 5A shows an example portion of a self-attention process, based on the principles disclosed herein.

FIG. 5A shows an example portion 500a of a self-attention process, based on the principles disclosed herein. As shown, a first step for calculating self-attention is to create three vectors from an embedding 508 of an input 502, the embedding 508 comprising an individual embedding 510 for an input word 504 ("thinking") and another individual embedding 512 for input word 506 ("machines"). The three vectors created for each of the input words 504, 506 comprise: (i) query vectors 514 comprising a first query vector 516 for the input word 504 and a second query vector 518 for the input word 506; (ii) key vectors 522 comprising a first key vector 524 for the input word 504 and a second vector 526 for the input word 506; and (iii) value vectors 530 comprising a first value vector 532 for the input word 504 and a second value vector 534 for the input word 506. The vectors 514, 522, 530 are generated by multiplying the embeddings 508 of the inputs 502 with the respective matrices 520, 528, 536. These three matrices 520, 528, 536 are trained during the training process of the transformer model. During deployment, these matrices 520, 528, 536 generate query, key and value vectors when multiplied by corresponding embedding vector (e.g., embedding 508).

Figure 5B:
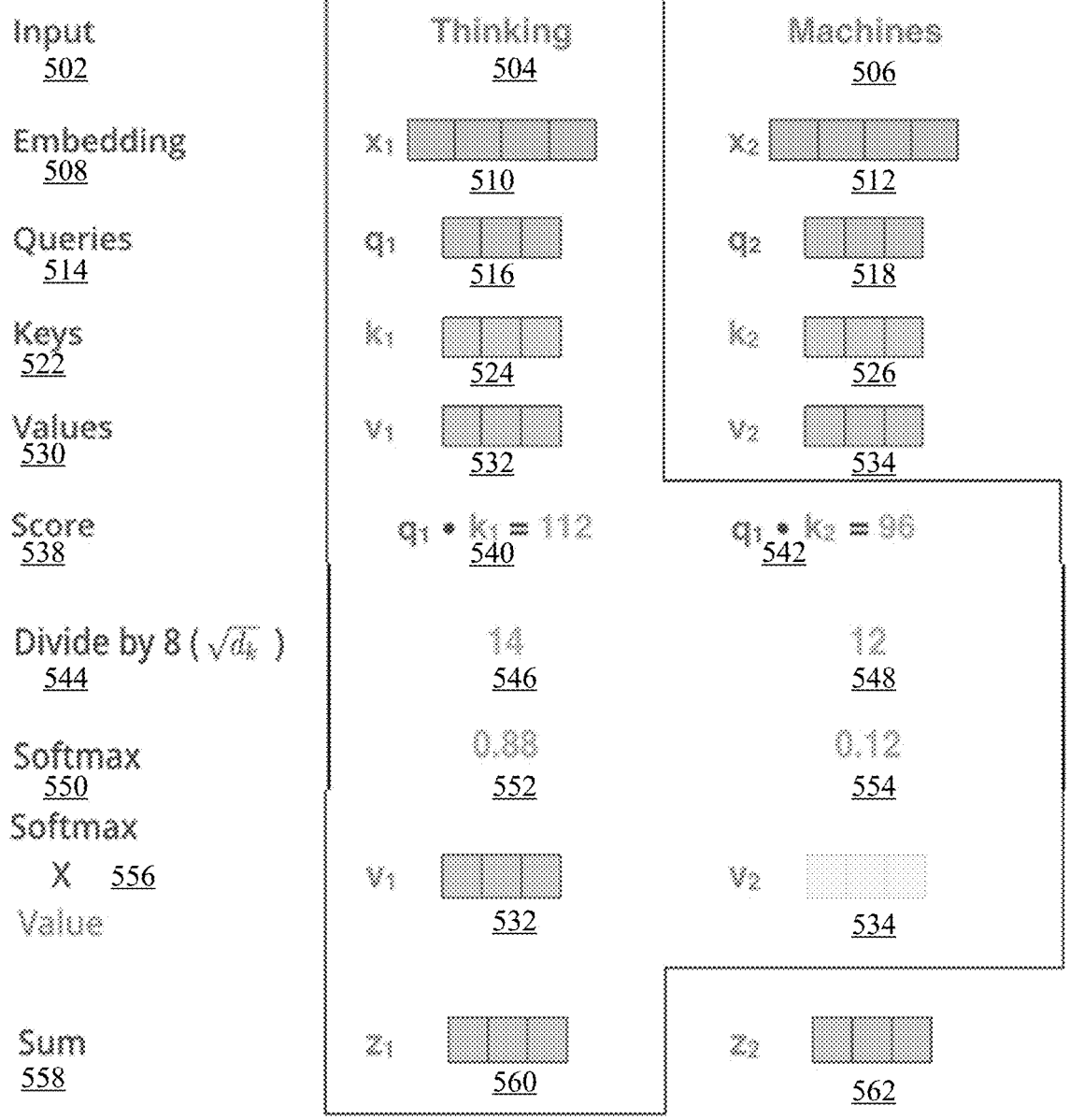
FIG. 5B shows another example portion of a self-attention process, based on the principles disclosed herein.

FIG. 5B shows another example portion 500b of a self-attention process, based on the principles disclosed herein. As shown, a second step in calculating self-attention is to calculate a score. For instance, when calculating self-attention for the first input word 504 "thinking," each word in an input sentence (i.e., input sentence comprising the word "thinking") is to be scored against the first input word 504. Thus, the calculated scores 538 determines how much focus to place on other parts of the input sentence as a word at a certain position is encoded. For instance, for input word 504, a score 540 is calculated by taking a dot product of the corresponding query vector 516 with the corresponding key vector 524. As another example, for input word 506, a score 542 is calculated by taking a dot product of the corresponding query vector 518 with the corresponding key vector 526 (i.e., dot product of 516 with 526 gives 542).

The scores 538 are then divided by the square root of the dimensions of the key vectors 522 (see divide operation 544). For instance, an example dimension of the key vectors is 64 (just an example, and not to be considered limiting), therefore, each of the scores 540, 542 are divided by 8 (i.e., square root of 64). The divisions result in corresponding gradients 546, 548 (with gradient values of 14, 12, respectively). These calculated gradients 546, 548 generally may be more stable. It should, however, be understood that the calculation of the gradients 546, 548 based on the aforementioned division operation is just an example, and other ways of calculating gradients (e.g., more stable gradients) should be considered within the scope of this disclosure.

The gradients 546, 548 are passed through a softmax operation 550 to generate corresponding softmax values 552, 554. The softmax operation 550 typically normalizes the gradient values 546, 548 to the softmax values 552, 554 such that the softmax values 552, 554 are positive and the sum thereof is 1. The softmax values 552, 554 are then multiplied with corresponding value vectors 532, 534 (multiplication operation 556). The multiplication is typically performed to keep intact the value of word(s) that are to be focused on, and drown-out the likely irrelevant words, e.g., by multiplying the irrelevant words by tiny numbers like 0.001, etc. The result of the multiplication of the value vectors 532, 534 with the corresponding softmax values 552, 554 (the result may be referred to as weighted value vectors) is summed in operation 558 to produce the corresponding outputs 560, 562. As shown, the output 560 correspond to the input word 504 ("thinking") and the output 562 corresponds to the input word 506 ("machines").

Figure 6:
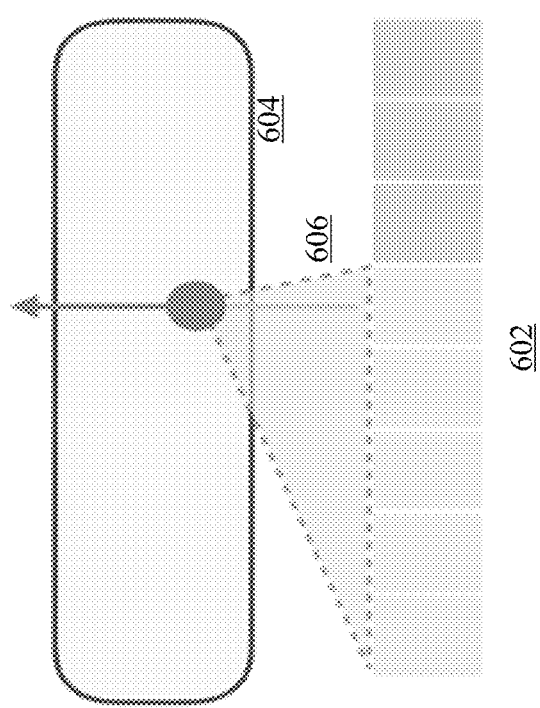
FIG. 6 shows an example masked self-attention process, based on the principles disclosed herein.

FIG. 6 shows an example masked self-attention 600, based on the principles disclosed herein. The masked self-attention 600 is implemented by the self-attention layers described herein. The masked self-attention 600 prevents an attention layer 604 from peeking at tokens 602 to its right (i.e., it peeks only at the tokens corresponding to area 606). A normal self-attention (not shown) generally allows the corresponding self-attention layer to peek at tokens at both left and right.

Figure 7:
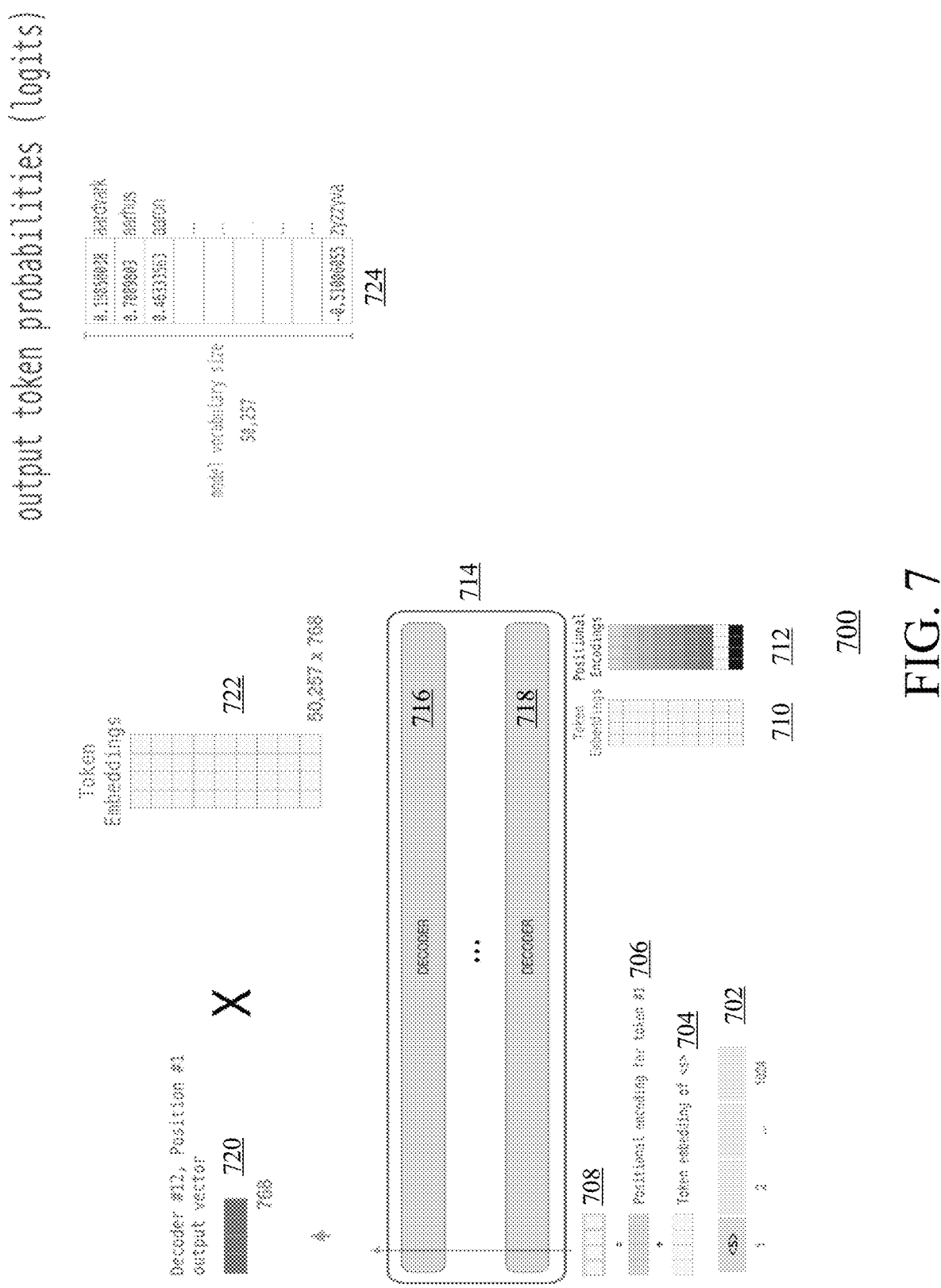
FIG. 7 shows an example generative pre-trained transformer 2 (GPT2) process, based on the principles disclosed herein.

FIG. 7 shows an example GPT2 process 700, based on the principles disclosed herein. It should however be understood that the process 700 is just an example and other processes with additional, alternative, or fewer number of components and or steps are within the scope of this disclosure. The process 700 may be performed by one or more of the components of the system 100 shown in FIG. 1.

As shown, from a sequence 702 of tokens (e.g., the tokens corresponding to particular text), a token <s> at position 1 is retrieved. Token embedding 704 of the token <s> is extracted from a token embeddings matrix 710. Position encoding 706 of the token <s> is extracted from the positional encodings matrix 712. An input 708 for a decoder stack 714 is generated by combining the token embedding 704 and the positional encoding 706. The input is passed through several decoder layers (example shown as decoder layers 716, 718) of the decoder stack to generate an output vector 720. The output vector 720 is multiplied by a token embeddings matrix 722 to generate the output token probabilities 724. The output token probabilities 724 show the probabilities of each of the predicted next word (or token) based on the input text. In the illustrated example, the token "aardvark" has a probability of 0.19850038 and the token "aarhus" has a probability of 0.7089803.

A generalized GPT2(e.g., pre-trained GPT2) model may not necessarily perform optimally for an expert electronic chat: a generalized GPT model makes general text predictions, wherein the expert electronic chat is based on domain specific knowledge. Therefore, using a transfer learning approach, a machine learning model (e.g., a GPT2 model) trained for a first task (e.g., a generalized text prediction) is retained from a second task (e.g., electronic expert chat prediction.) The retraining may also be referred to herein as a "transfer learning through knowledge transfer."

Figure 8:
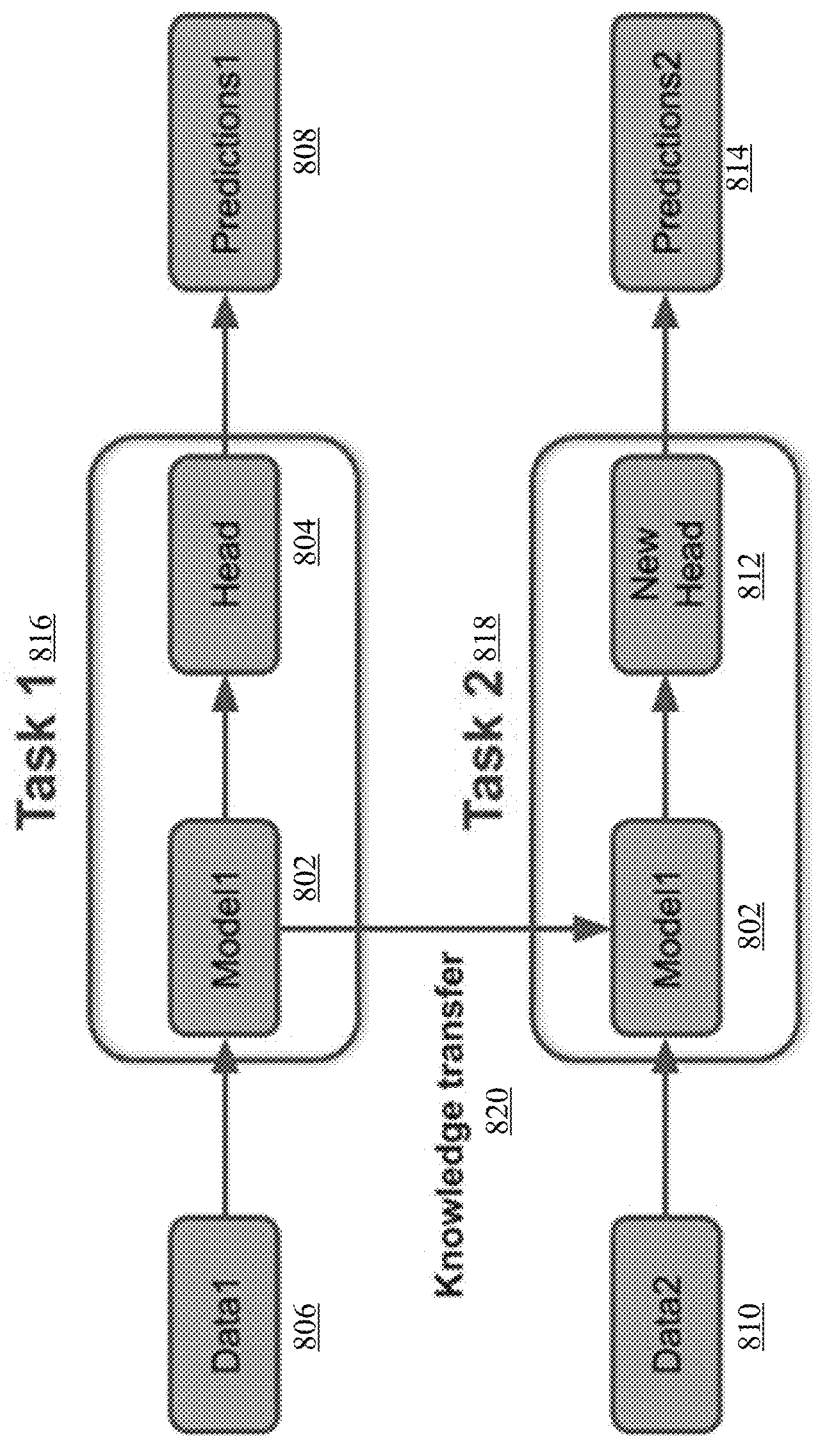
FIG. 8 shows an example transfer learning process, based on the principles disclosed herein.

FIG. 8 shows an example transfer learning process 800, based on the principles disclosed herein. As shown, the transfer learning process 800 uses a machine learning model 802 developed and trained for a first task 816 (generalized prediction) to a second task 818 through a knowledge transfer 820. Particularly, a head 804 (e.g., one or more layers closer to output 808) is changed to a new head 812 through knowledge transfer 820 to adapt the machine learning model 802 to generate output 814 for the second task. As shown, input 806 associated with the first task 816 may be general natural language text to generate a general text prediction as the output 808. After the knowledge transfer 820, input 810 associated with the second task 818 may be domain specific language text to generate a domain specific text prediction as the output 814. The domain specific language may include industry specific terms and jargons used in the expert electronic chat.

In the embodiments, the GPT2 machine learning models, e.g., generated through knowledge transfer, are generally used for global predictions of the expert electronic chat. The global predictions may have to be augmented by the local, expert-specific predictions. For that purpose, n-gram machine learning models may be used.

Figure 9:
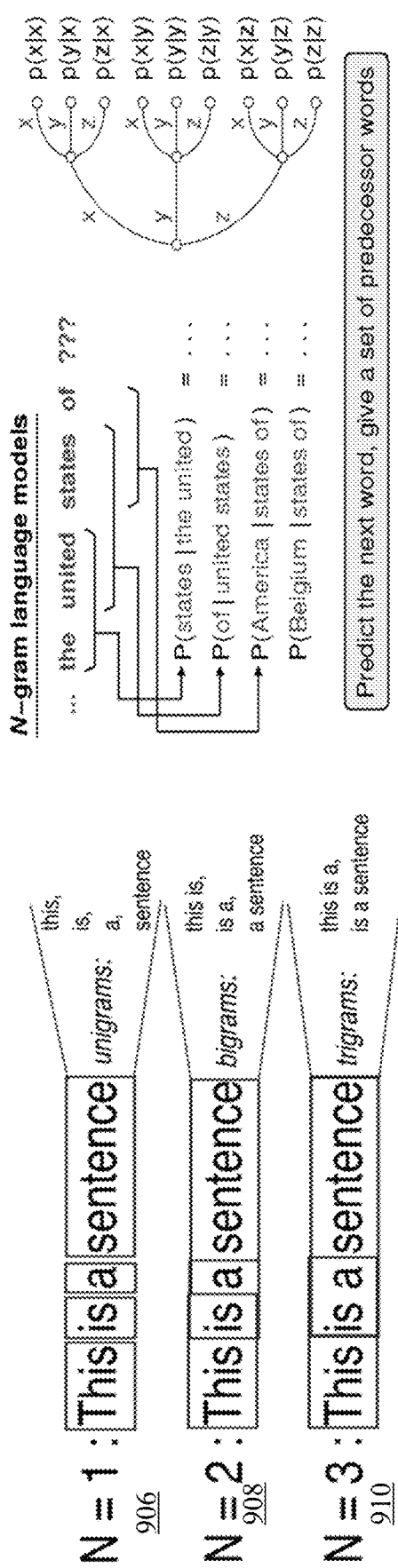
FIG. 9 shows example structures of n-gram machine learning models, based on the principles disclosed herein.

FIG. 9 shows example structures 902, 904 of n-gram machine learning models, based on the principles disclosed herein. Generally, n-gram machine learning models comprise a contiguous sequence of n items from a given sample of text or speech. The items can be phonemes, syllables, letters, words, and or base pairs, based on the application. For example, as shown in the first structure 902, an n-gram machine learning model may use a unigram 906, each entry having a single word ("This," "is." "a," and "sentence."). The n-gram machine learning model may use a bigram 908, each entry having two words ("This is," "is a," and "a sentence."). The n-gram machine learning model may use a trigram 910, each entry having three words ("This is a" and "is a sentence."). These are just a few examples, and n-grams of any length can be used consistent with the embodiments of this disclosure.

An n-gram machine learning model predicts a word ($X_i$) based on previous words $x_{i-(n-1)}, \ldots, x_{i-1}$. The prediction can be probabilistically represented as $P(x_i | x_{i-(n-1)}, \ldots, x_{i-i})$. The second structure 904 shows an illustration of the probability. The n-gram machine learning model is used to train on expert specific data to capture the writing pattern of the expert and then augment the prediction generated by the GPT2 model (and or any other type of domain specific global model).

The disclosed ensemble of machine learning models also comprises a word completion machine learning model, e.g., a character based recurrent neural network (RNN) for word completion. A word completion machine learning model generally is small vocabulary and yet flexible in handling any word, punctuation, and other document structure.

Figure 10:
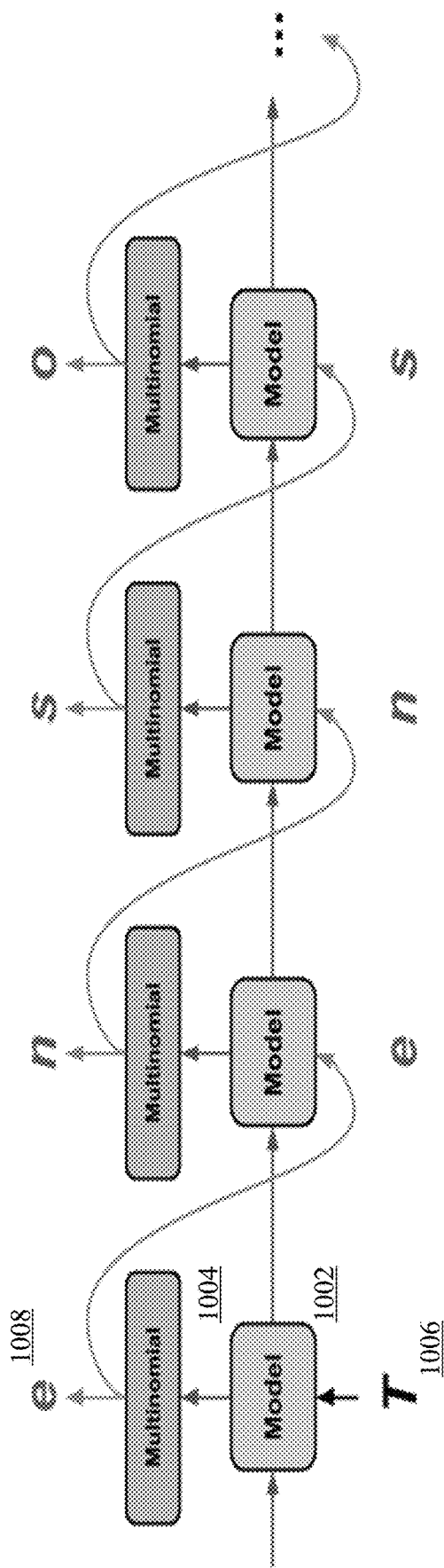
FIG. 10 shows an example of a word completion model, based on the principles disclosed herein.

FIG. 10 shows an example of a word completion model 1000 based on the principles disclosed herein. As shown, the word completion model 1000 comprises a series of model layers (an example has been labeled as 1002) and a series of multinomial layers (an example has been labeled as 1004). The input (an example labeled as 1006) to each model is a character of a word and the output (an example labeled as 1008) is the next character of a predicted word.

Figure 11:
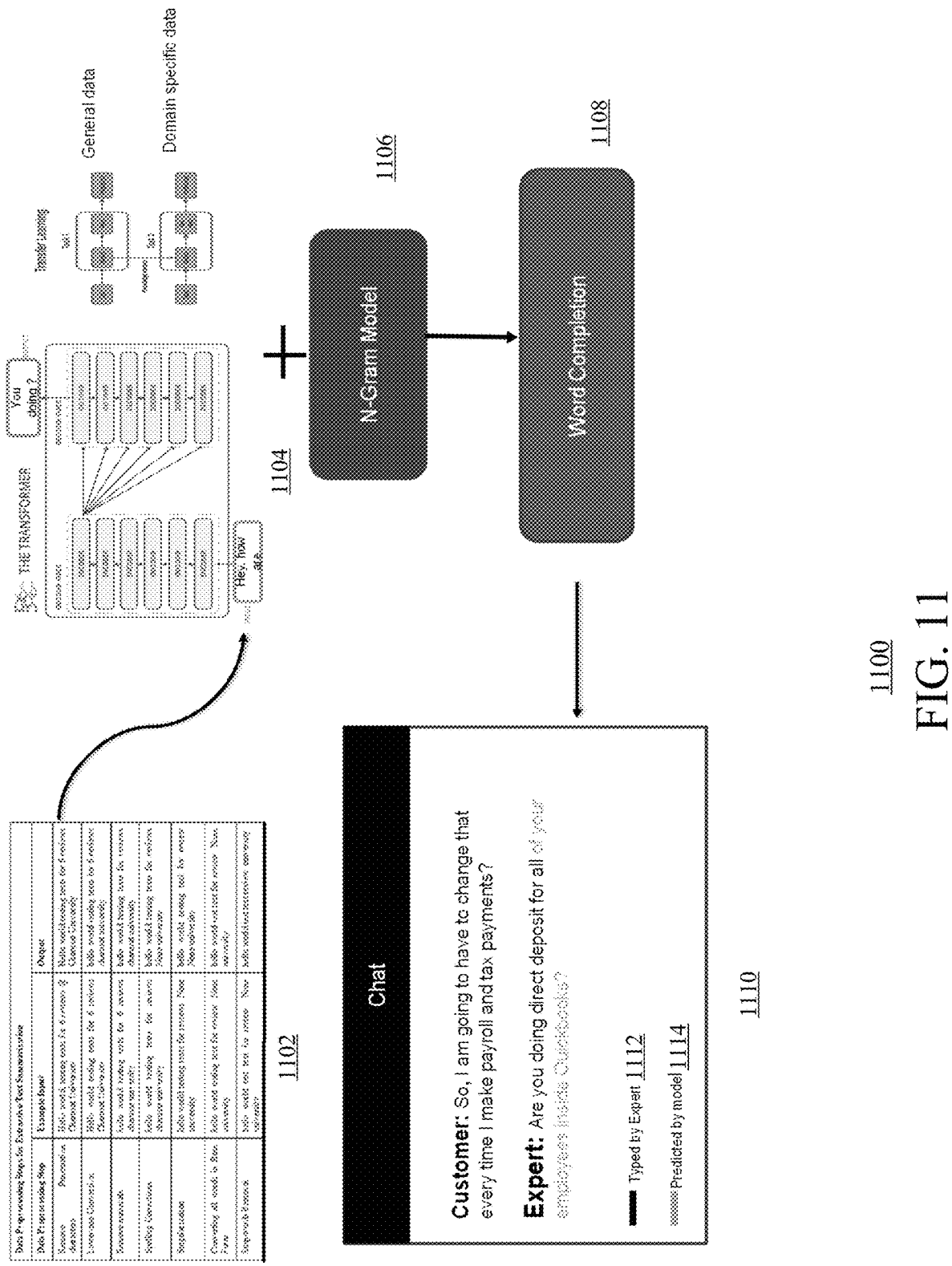
FIG. 11 shows an example prediction process for an expert electronic chat based on the principles disclosed herein.

FIG. 11 shows an example prediction process 1100 for an expert electronic chat based on the principles disclosed herein. It should however be understood that the process 1100 is just an example and other processes with additional, alternative, or fewer number of components and or steps are within the scope of this disclosure. The process 1100 may be performed by one or more of the components of the system 100 shown in FIG. 1.

As shown, the process 1100 uses an ensemble of three machine learning models: a transformer model 1104 based on transfer learning (e.g., a retrained GPT2 model), an n-gram machine learning model 1106, and a word completion machine learning model 1108. An input 1102 (e.g., text data typed by an expert, shown more clearly as the text 1112 in the chat window 1110) is provided as an input 1102 to the ensemble of the machine learning models to generate text data 1114 predicted by the ensemble. Both the text data 1112 typed by the expert and the text data 1114 predicted by the ensemble are displayed on a chat window 1110. The text data 1114 is predicted and displayed in real-time as the expert types the text data 1112 in the chat window 1110.

Figure 12:
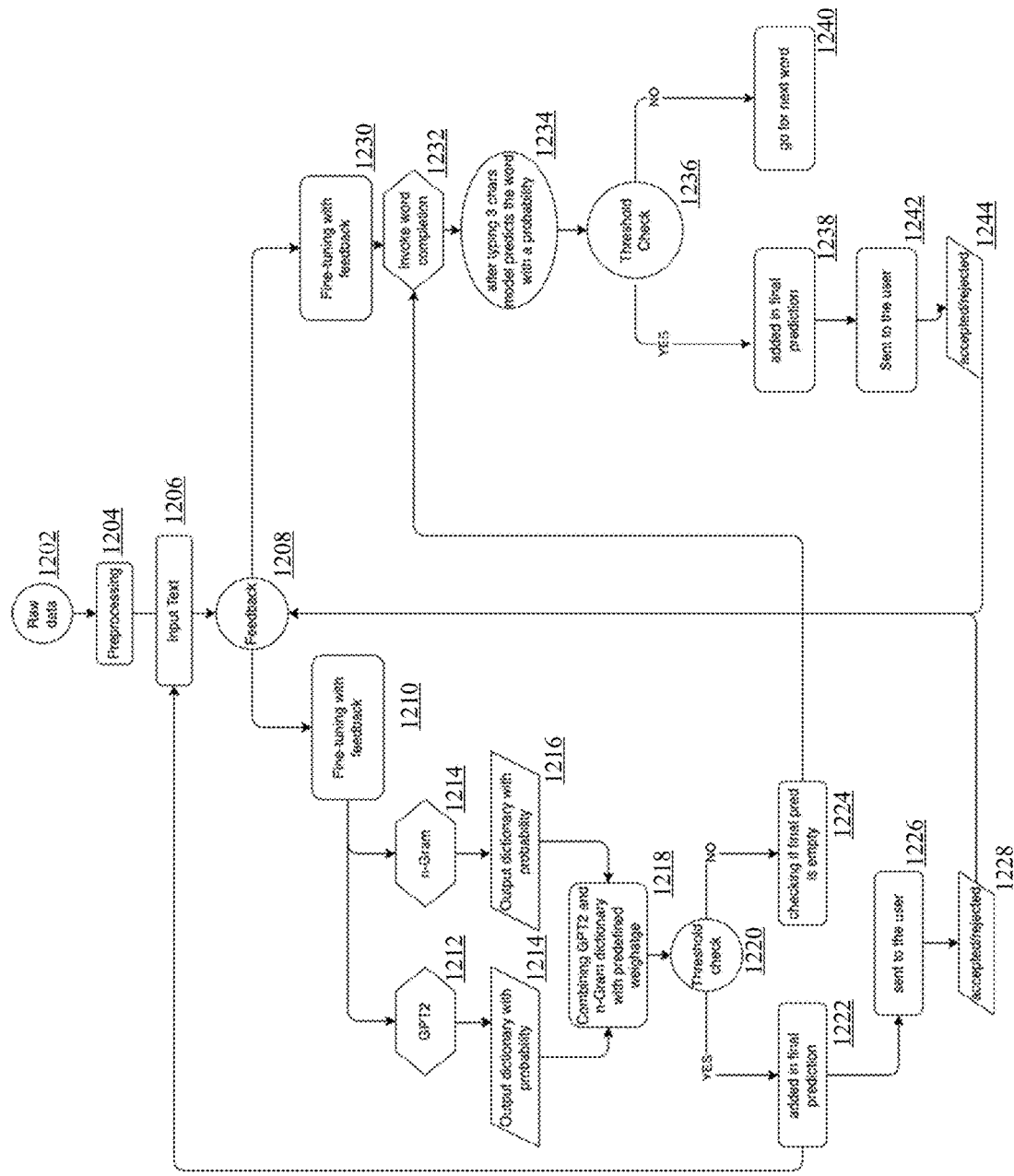
FIG. 12 shows a flow diagram of an example method of expert electronic chat predictions, based on the principles disclosed herein.

FIG. 12 shows a flow diagram of an example method 1200 of expert electronic chat predictions based on the principles disclosed herein. It should be understood that the steps of the method 1200 are merely examples, and methods with additional, alternative, or fewer number of steps should be considered within the scope of this disclosure. The steps of the method 1200 may be performed by one or more components of the system 100 of FIG. 1.

The method 1200 begins at 1204 where raw data 1202 is preprocessed (e.g., using method 200 of FIG. 2) to generate input text 1206. The input text 1206 is provided to a feedback loop 1208, where the feedback loop 1208 is used to retrain and or fine tune one or more machine learning models in the ensemble of machine learning models used by the method 1200. For example, results of the accepted/rejected steps 1228, 1244 are fed back to the machine learning models using the feedback loop 1208. The fine tuning steps 1210, 1230 are typically bypassed when feeding the input text 1206 to the machine learning models.

The input text 1206 is fed into a GPT2 machine learning model 1212 and an n-gram machine learning model 1214. The GPT2 machine learning model 1212 may output a dictionary of words with corresponding probabilities 1214. In other words, the input the GPT2 model generates a plurality of words each with a corresponding probability (see FIG. 7). Furthermore, the n-gram machine learning model 1214 also generates an output dictionary of words with corresponding probabilities 1216.

At step 1218, the words and corresponding probabilities are combined with a predefined weightage. Such combination with the predefined weightage may include, for example, a weighted comparison. For example, a first probability of a first word generated by the GPT model may be weighted by a factor of a1 and a second probability of a second word generated by the n-gram machine learning model may be weighted by a factor of α2. An example output in this scenario can be represented as:

For each word in the dictionaries from GPT2 and n-gram
If (α1*GPT2 probability>α2*n-gram probability)
Predict GPT2 output
Else:
Predict n-gram output.

At step 1220, a threshold check is performed to determine whether the combined scores (e.g., the sums of the corresponding weighted probabilities, or the output with the highest probability) exceed a predetermined threshold. If at least one combined score exceeds the predetermined threshold, the corresponding word is added in the final prediction at step 1222 and the word is sent to the user in step 1226 (e.g., displayed as a word prediction in the chat window). At step 1228, the user may accept or reject the predicted word, and the acceptance/rejection is fed back to the GPT2 machine learning model 1212 and or the n-gram machine learning model 1214 through the feedback 1208 loop to fine tune (box 1210) the machine learning models.

If however there are no words that exceed the threshold in step 1220, step 1224 is executed to determine if the final prediction is empty. If the final prediction is empty, the word completion machine learning model is invoked at step 1232. The word completion machine learning model at step 1234 predicts a word with a probability after three characters are typed by the expert user (prediction based on three characters is just an example, and prediction based on any number of characters should be considered within the scope of this disclosure). At step 1236, a threshold check is performed whether the predicted word exceeds another predetermined threshold. If the threshold is exceeded, the predicted word is added to the final prediction at step 1238. If the threshold is not exceeded, a word for the current characters being typed is not predicted and the method 1200 may be performed for a next word in step 1240. If the threshold is exceeded and the word is added to the final prediction, the predicted word is sent to the expert user at step 1242 (e.g., displayed on the chat window). The word completion machine learning model, the GPT2 machine learning model, and or the n-gram machine learning model are fine-tuned using the feedback 1208 loop based on the acceptance/rejection of the predicted word by the expert user at 1244.

Figure 13:
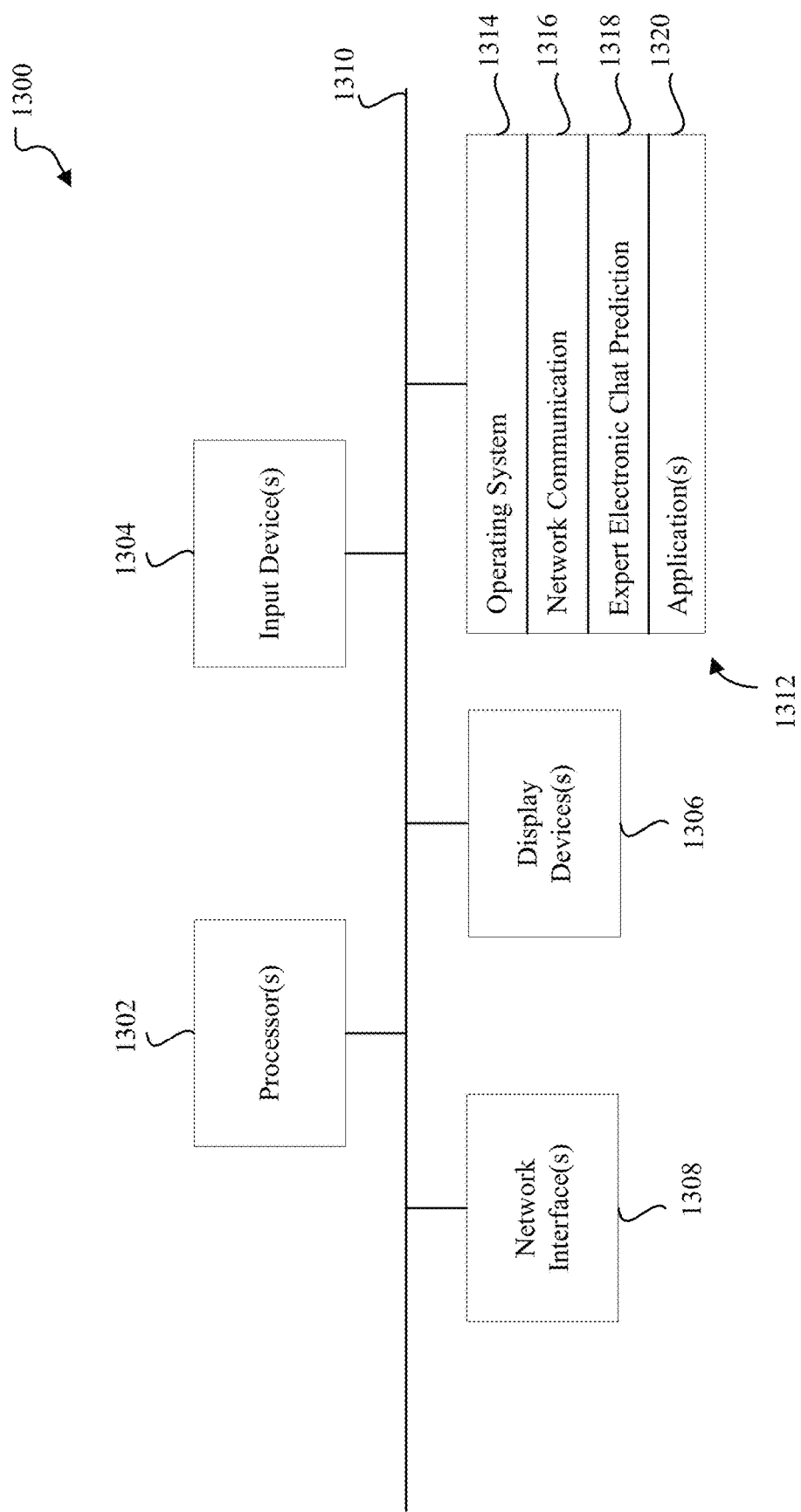
FIG. 13 shows a block diagram of an example computing device that implements various features and processes, based on the principles disclosed herein.

FIG. 13 shows a block diagram of an example computing device 1300 that implements various features and processes, based on the principles disclosed herein. For example, computing device 1300 may function as first server 120, second server 130, client 150a, client 150b, or a portion or combination thereof in some embodiments. The computing device 1300 also performs one or more steps of the methods 200 and 1700. The computing device 1300 is implemented on any electronic device that runs software applications derived from compiled instructions, including without limitation personal computers, servers, smart phones, media players, electronic tablets, game consoles, email devices, etc. In some implementations, the computing device 1300 includes one or more processors 1302, one or more input devices 1304, one or more display devices 1306, one or more network interfaces 1308, and one or more computer-readable media 1312. Each of these components is be coupled by a bus 1310.

Display device 1306 includes any display technology, including but not limited to display devices using Liquid Crystal Display (LCD) or Light Emitting Diode (LED) technology. Processor(s) 1302 uses any processor technology, including but not limited to graphics processors and multi-core processors. Input device 1304 includes any known input device technology, including but not limited to a keyboard (including a virtual keyboard), mouse, track ball, and touch-sensitive pad or display. Bus 1310 includes any internal or external bus technology, including but not limited to ISA, EISA, PCI, PCI Express, USB, Serial ATA or FireWire. Computer-readable medium 1312 includes any non-transitory computer readable medium that provides instructions to processor(s) 1302 for execution, including without limitation, non-volatile storage media (e.g., optical disks, magnetic disks, flash drives, etc.), or volatile media (e.g., SDRAM, ROM, etc.).

Computer-readable medium 1312 includes various instructions 1314 for implementing an operating system (e.g., Mac OS®, Windows®, Linux). The operating system may be multi-user, multiprocessing, multitasking, multi-threading, real-time, and the like. The operating system performs basic tasks, including but not limited to: recognizing input from input device 1304; sending output to display device 1306; keeping track of files and directories on computer-readable medium 1312; controlling peripheral devices (e.g., disk drives, printers, etc.) which can be controlled directly or through an I/O controller; and managing traffic on bus 1310. Network communications instructions 1316 establish and maintain network connections (e.g., software for implementing communication protocols, such as TCP/IP, HTTP, Ethernet, telephony, etc.).

Expert electronic chat prediction instructions 1318 include instructions that implement the disclosed processes and methods for expert chat predictions, as described throughout this disclosure.

Application(s) 1320 may comprise an application that uses or implements the processes described herein and/or other processes. The processes may also be implemented in the operating system.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In one embodiment, this may include Python.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method performed by a processor, said method comprising:

receiving input text typed by an expert user from an expert electronic chat window;

feeding the input text through an ensemble of machine learning models comprising a transformer machine learning model trained as a global model for domain specific knowledge, an n-gram machine learning model trained during runtime as a local model for the expert user specific style, and a word completion machine learning model;

predicting at least one word to be added to the input text in real-time using at least the transformer machine learning model and the n-gram machine learning model in the ensemble; and providing the at least one word for display in the electronic chat window after determining that a score associated with the at least one word exceeds a predetermined threshold.

2. The method of claim 1, further comprising:

receiving an indication whether the at least one word was accepted or rejected by the expert user; and fine tuning at least one of the transformer machine learning model, the n-gram machine learning model, and the word completion machine learning model based on the received indication.

3. The method of claim 1, wherein feeding the input text through the ensemble of the machine learning models comprises:

feeding the input text through the transformer machine learning model and the n-gram machine learning model;

generating a first plurality of words and a first set of probabilities using the transformer machine learning model;

generating a second plurality of words and a second set of probabilities using the n-gram machine learning model; and combining the first plurality of words and the second plurality of words and weighing corresponding probabilities from the first set of probabilities and the second set of probabilities;

wherein the predetermined threshold is a weighted probability threshold and predicting in real-time the at least one word further comprises:

determining that a word from the combined first plurality of words and the second plurality of words has a weighted probability above the weighted probability threshold, and designating the word as the predicted at least one word.

4. The method of claim 3, wherein combining the first plurality of words and the second plurality of words in association with weighing corresponding probabilities comprises:

comparing a weighed probability of a first word from the first plurality of words with a weighted probability of a second word from the second plurality of words, the designated word being associated with a higher weighted probability.

5. The method of claim 1, wherein feeding the input text through the ensemble of the machine learning models comprises:

feeding the input text through the transformer machine learning model and the n-gram machine learning model;

generating a first plurality of words and a first set of probabilities using the transformer machine learning model;

generating a second plurality of words and a second set of probabilities using the n-gram machine learning model; and combining the first plurality of words and the second plurality of words and weighing corresponding probabilities from the first set of probabilities and the second set of probabilities;

wherein the predetermined threshold is a word completion probability threshold and predicting in real-time the at least one word further comprises:

determining that none of the words from the combined first plurality of words and the second plurality of words have a weighted probability above a weighted probability threshold, feeding the input text through the word completion model to predict one or more characters being typed to generate a complete word, determining that the complete word has a probability above the word completion threshold, and designating the complete word as the predicted at least one word.

6. The method of claim 1, wherein the transformer machine learning model was trained by retraining a general natural language prediction model using domain specific knowledge.

7. The method of claim 1, wherein using the transformer machine learning model comprises using a generative pre-trained transformer 2 model.

8. The method of claim 1, wherein using the word completion machine learning model comprises using a recurrent neural network.

9. The method of claim 1, further comprising:

preprocessing the input text before feeding it into the ensemble of the machine learning models.

10. A system comprising:

at least one processor; and a computer readable non-transitory storage medium storing computer program instructions that when executed by the at least one processor cause the at least one processor to perform operations comprising:

receiving an input text typed by an expert user from an expert electronic chat window;

feeding the input text through an ensemble of machine learning models comprising a transformer machine learning model trained as a global model for domain specific knowledge, an n-gram machine learning model trained during runtime as a local model for the expert user specific style, and a word completion machine learning model;

predicting, in real-time and using at least the transformer machine learning model and the n-gram machine learning in the ensemble, at least one word to be added to the input text; and providing the at least one word for display in the electronic chat window after determining that a score associated with the at least one word exceeds a predetermined threshold.

11. The system of claim 10, wherein the operations further comprise:

receiving an indication whether the at least one word was accepted or rejected by the expert user; and fine tuning at least one of the transformer machine learning model, the n-gram machine learning model, and the word completion machine learning model based on the received indication.

12. The system of claim 10, wherein feeding the input text through the ensemble of the machine learning models comprises:

feeding the input text through the transformer machine learning model and the n-gram machine learning model;

generating a first plurality of words and a first set of probabilities using the transformer machine learning model;

generating a second plurality of words and a second set of probabilities using the n-gram machine learning model; and combining the first plurality of words and the second plurality of words in association with weighing corresponding probabilities from the first set of probabilities and the second set of probabilities;

wherein the predetermined threshold is a weighted probability threshold and, predicting in real-time the at least one word further comprises:

determining that a word from the combined first plurality of words and the second plurality of words has a weighted probability above the weighted probability threshold, and designating the word as the predicted at least one word.

13. The system of claim 12, wherein combining the first plurality of words and the second plurality of words in association with weighing corresponding probabilities comprises:

comparing a weighed probability of a first word from the first plurality of words with a weighted probability of a second word from the second plurality of words, the designated word being associated with a higher weighted probability.

14. The system of claim 10, wherein feeding the input text through the ensemble of the machine learning models comprises:

feeding the input text through the transformer machine learning model and the n-gram machine learning model;

generating a first plurality of words and a first set of probabilities using the transformer machine learning model;

generating, a second plurality of words and a second set of probabilities using the n-gram machine learning model; and combining the first plurality of words and the second plurality of words and weighing corresponding probabilities from the first set of probabilities and the second set of probabilities;

wherein the predetermined threshold is a word completion probability threshold, and predicting in real-time the at least one word further comprises:

determining that none of the words from the combined first plurality of words and the second plurality of words have a weighted probability above a weighted probability threshold, feeding the input text through the word completion model to predict one or more characters being typed to generate a complete word;

determining that the complete word has a probability above the word completion threshold, and designating the complete word as the predicted at least one word.

15. The system of claim 10, wherein the transformer machine learning model was trained by retraining a general natural language prediction model using domain specific knowledge.

16. The system of claim 10, wherein using the transformer machine learning model comprises using a generative pretrained transformer 2 model.

17. A computer readable non-transitory storage medium storing computer program instructions that when executed cause operations comprising:

receiving an input text typed by an expert user from an expert electronic chat window;

feeding the input text through an ensemble of machine learning models comprising a transformer machine learning model trained as a global model for domain specific knowledge, an n-gram machine learning model trained during runtime as a local model for the expert user specific style, and a word completion machine learning model;

predicting, in real-time and using at least one of the transformer machine learning model and the n-gram machine learning model in the ensemble, at least one word to be added to the input text; and providing the at least one word for display in the electronic chat window after determining that a score associated with the at least one word exceeds a predetermined threshold.

18. The non-transitory storage medium of claim 17, wherein feeding the input text through the ensemble of the machine learning models comprises:

feeding the input text through the transformer machine learning model and the n-gram machine learning model;

generating a first plurality of words and a first set of probabilities using the transformer machine learning model;

generating a second plurality of words and a second set of probabilities using the n-gram machine learning model; and combining the first plurality of words and the second plurality of words and weighing corresponding probabilities from the first set of probabilities and the second set of probabilities;

wherein the predetermined threshold is a weighted probability threshold, and predicting in real-time the at least one word further comprises:

determining that a word from the combined first plurality of words and the second plurality of words has a weighted probability above the weighted probability threshold, and designating the word as the predicted at least one word.

19. The non-transitory storage medium of claim 17, wherein feeding the input text through the ensemble of the machine learning models comprises:

feeding the input text through the transformer machine learning model and the n-gram machine learning model;

generating a first plurality of words and a first set of probabilities using the transformer machine learning model;

generating a second plurality of words and a second set of probabilities using the n-gram machine learning model; and combining the first plurality of words and the second plurality of words in association with weighing corresponding probabilities from the first set of probabilities and the second set of probabilities;

wherein the predetermined threshold is a word completion probability threshold, and predicting in real-time the at least one word further comprises:
- determining that none of the words from the combined first plurality of words and the second plurality of words have a weighted probability above a weighted probability threshold,
- feeding the input text through the word completion model to predict one or more characters being typed to generate a complete word;
- determining that the complete word has a probability above the word completion threshold, and
- designating the complete word as the predicted at least one word.

* * * * *